(12) United States Patent
Jager et al.

(10) Patent No.: US 8,365,097 B2
(45) Date of Patent: Jan. 29, 2013

(54) INTERFACE FOR SELECTION OF ITEMS

(75) Inventors: Ivo Ruben Willem Jager, Amstelveen (NL); Kevin Michael O'Shaughnessy, Galway (IE); William Kameron Stewart, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 11/937,157

(22) Filed: Nov. 8, 2007

(65) Prior Publication Data

US 2009/0125476 A1  May 14, 2009

(51) Int. Cl.
*G06F 3/048* (2006.01)
*G06F 3/00* (2006.01)
*G06F 3/14* (2006.01)
*G09G 5/00* (2006.01)

(52) U.S. Cl. ......... 715/845; 715/810; 715/835; 715/856

(58) Field of Classification Search .................. 715/845, 715/810, 835, 856
See application file for complete search history.

(56) References Cited

U.S. PATENT DOCUMENTS

| | | | | |
|---|---|---|---|---|
| 5,276,797 | A * | 1/1994 | Bateman et al. | 715/823 |
| 6,023,267 | A * | 2/2000 | Chapuis et al. | 715/810 |
| 6,147,683 | A * | 11/2000 | Martinez et al. | 715/786 |
| 6,208,340 | B1 * | 3/2001 | Amin et al. | 715/808 |
| 6,535,229 | B1 * | 3/2003 | Kraft | 715/764 |
| 6,639,612 | B2 * | 10/2003 | Bosma et al. | 715/769 |
| 7,580,363 | B2 * | 8/2009 | Sorvari et al. | 370/252 |
| 7,738,861 | B2 * | 6/2010 | Fournier | 455/415 |
| 7,764,272 | B1 * | 7/2010 | Clifton-Bligh | 345/173 |
| 2003/0095153 | A1 | 5/2003 | Bosma et al. | |
| 2003/0128226 | A1 * | 7/2003 | Handy Bosma et al. | 345/700 |
| 2004/0039661 | A1 * | 2/2004 | Fuzell-Casey et al. | 705/27 |
| 2004/0266468 | A1 * | 12/2004 | Brown et al. | 455/518 |
| 2005/0057498 | A1 * | 3/2005 | Gentle | 345/157 |
| 2006/0121939 | A1 * | 6/2006 | Anwar et al. | 455/556.2 |
| 2006/0148512 | A1 * | 7/2006 | Ekholm et al. | 455/550.1 |
| 2007/0130200 | A1 * | 6/2007 | Ogren | 707/104.1 |
| 2007/0168879 | A1 * | 7/2007 | Reville et al. | 715/810 |
| 2007/0211040 | A1 * | 9/2007 | Wang et al. | 345/173 |
| 2008/0125059 | A1 * | 5/2008 | Schultz et al. | 455/90.2 |
| 2008/0250354 | A1 * | 10/2008 | Park | 715/845 |

* cited by examiner

Primary Examiner — Jordany Nunez (57) ABSTRACT

An apparatus (and method) is configured to perform an operation on a plurality of items of data. A memory stores data identifying said items. The apparatus generates a list of selected items identifying an item in response to a first selection signal; performs a selection operation to add an item to said list of selected items by: responsive to (a) a first move cursor signal: identifying a first item of said plurality of items stored in said memory; and adding said first identified item to said list of selected items if said item is not already on said list and (b) a second move cursor signal: identifying a second item of said plurality of items stored in said memory; removing said first identified item from said list of selected items. The apparatus adds said second identified item to said list of selected items if said second item is not on said list.

21 Claims, 5 Drawing Sheets

INTERFACE FOR SELECTION OF ITEMS

BACKGROUND

1. Field of Art

The present disclosure relates to data processing apparatus and a method of operating data processing apparatus, and more particularly to electronic devices that have a user interface configured for a user to select one or more data items (e.g., contacts) with which to perform an operation, such as to make a push to talk call.

2. Description of the Related Art

It is known to select one or more contacts from a list of contacts with which to perform a subsequent operation. For example, it is known to select one or more contacts from an address book on a mobile telephone with which to subsequently communicate. Typically, this is performed by a user using cursor keys on the keypad of the telephone to highlight one of a list of contacts displayed via an address book, and pressing a "select" button when a desired contact is highlighted to place a check mark in a check box associated with that contact. The user can repeat this operation to select as many contacts as desired, before pressing a "communicate" button to initiate a communications application such as a push to talk application, or an SMS application with the selected contacts.

Conventional push-to-talk (PTT) applications are known to be used on mobile telephones. The push to talk application provides a two-way radio having a bi-directional radio transceiver operating as a half-duplex channel in which only one unit transmits at a time, and any number of units can listen. Such a service allows a user of the mobile telephone to instantly reach one or more users of other mobile telephones while eliminating the dialing and ringing steps that are required when making a regular cellular telephone call. Such operation is sometimes known as a "walkie-talkie" service.

In order to set up a PTT call, a user must select one or more contacts by scrolling through a list of contacts and selecting those users with which they wish to participate in a PTT call. As long as those contacts are available, the user can hold down a PTT button on their mobile phone, speak into the microphone of their mobile phone, and a signal representative of their speech will be transmitted to the selected contact's mobile phones.

SUMMARY

Aspects and embodiments disclosed herein were devised with the foregoing in mind. For example, in a first aspect, there is provided a method of operating a data processing apparatus to perform an operation on a plurality of items of data, the data processing apparatus having a memory which stores data identifying said plurality of items of data.

In one example embodiment, the method comprises generating a list of selected items of data identifying at least one item of data in response to a first selection signal. The method comprises performing a further selection operation to add at least one further item of data to said list of selected items of data. Specifically, the method comprises, responsive to a first move cursor signal, identifying a first item of data of said plurality of items of data stored in said memory and adding said first identified item of data to said list of selected items of data if said item is not already on said list. In addition, the method comprises, responsive to a second move cursor signal, identifying a second item of data of said plurality of items of data stored in said memory, removing said first identified item of data from said list of selected items of data, and adding said second identified item of data to said list of selected items of data if said second item is not already on said list. The method also comprises performing an operation on the items identified by said list of selected items of data in response to receipt of an operation signal.

In a second aspect, there is provided data processing apparatus for performing an operation on a plurality of items of data. In one embodiment, the apparatus comprises a processor and a memory. The memory has stored therein data identifying said plurality of items of data. The data processing apparatus configured to generate a list of selected items of data identifying at least one item of data in response to a first selection signal.

In addition, the data processing apparatus is configured to perform a further selection operation to add at least one further item of data to said list of selected items of data by, responsive to a first move cursor signal, identifying a first item of data of said plurality of items of data stored in said memory and adding said first identified item of data to said list of selected items of data if said item is not already on said list, and by, responsive to a second move cursor signal, identifying a second item of data of said plurality of items of data stored in said memory, removing said first identified item of data from said list of selected items of data, and adding said second identified item of data to said list of selected items of data if said second item is not already on said list. The data processing apparatus also is configured to perform an operation on the items identified by said list of selected items of data in response to receipt of an operation signal.

It is noted that the first identified item of data may be removed from said list of selected items of data if said second move cursor signal was received prior to a further selection signal. Further, identifying items of data in response to move cursor signals in this way can reduce and/or remove ambiguity when a user is selecting a plurality of items to perform the subsequent operation, and can also reduce the amount of user input required by a user in order to perform the operation. The data identifying said plurality of items of data may be contacts in an address book.

Performing the operation may comprise setting up a communications operation with the contacts identified by said list of selected items of data. The communications operation may be a push-to-talk call. In some embodiments the operation may be an action/operation on the contacts that is not necessarily a communication operation, such as adding contacts to a group or deleting contacts. The operation may be a PTT operation, which may or may not be a communications operation to set up a PTT call.

Identifying the first and/or second item may comprise displaying and highlighting the respective first and/or second item on a user interface of the data processing apparatus. Identifying the first and/or second item may comprise displaying a check mark in association with the respective first and/or second item on a user interface of the data processing apparatus. Identifying the first and/or second items in this way may provide a clear indication to the user of which items are selected for the operation.

The data processing apparatus may comprise one of a mobile computing device, a mobile telephone, a personal digital assistant, a personal computer and a laptop. In addition, there may be provided a computer program comprising machine or computer-readable program elements for configuring a data processing apparatus or to configure a data processing apparatus as described herein and/or to implement a method described herein.

It is noted that one or more embodiments described herein may provide a reduction in the number of keystrokes required for a user to select one or more items of data from a list before initiating an operation associated with those data items, and/or may reduce ambiguity as to which data items are selected for a subsequent operation. This may be achieved by associating a "floating check mark" with a data item when it is highlighted such that a user can unambiguously and easily determine whether or not that data item is currently selected for the subsequent operation.

Highlighting for a local operation (such as moving a cursor over data items for adding data items to a list of selected items) may be disambiguated from the selection of data items for a global operation (the subsequent operation on the data items that have been added to list of selected data items).

There may be provided a carrier medium carrying a computer program described herein. The carrier medium may be one of the following: solid-state memory; magnetic memory; CD-ROM; digital versatile disk (DVD); read-write CD; an electronic signal; radio frequency carrier wave or optical carrier wave.

BRIEF DESCRIPTION OF DRAWINGS

The disclosed embodiments have other advantages and features which will be more readily apparent from the detailed description, the appended claims, and the accompanying drawings (or Figures). The Figures include:

FIG. (or FIG.) 1 illustrates a mobile telephone.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
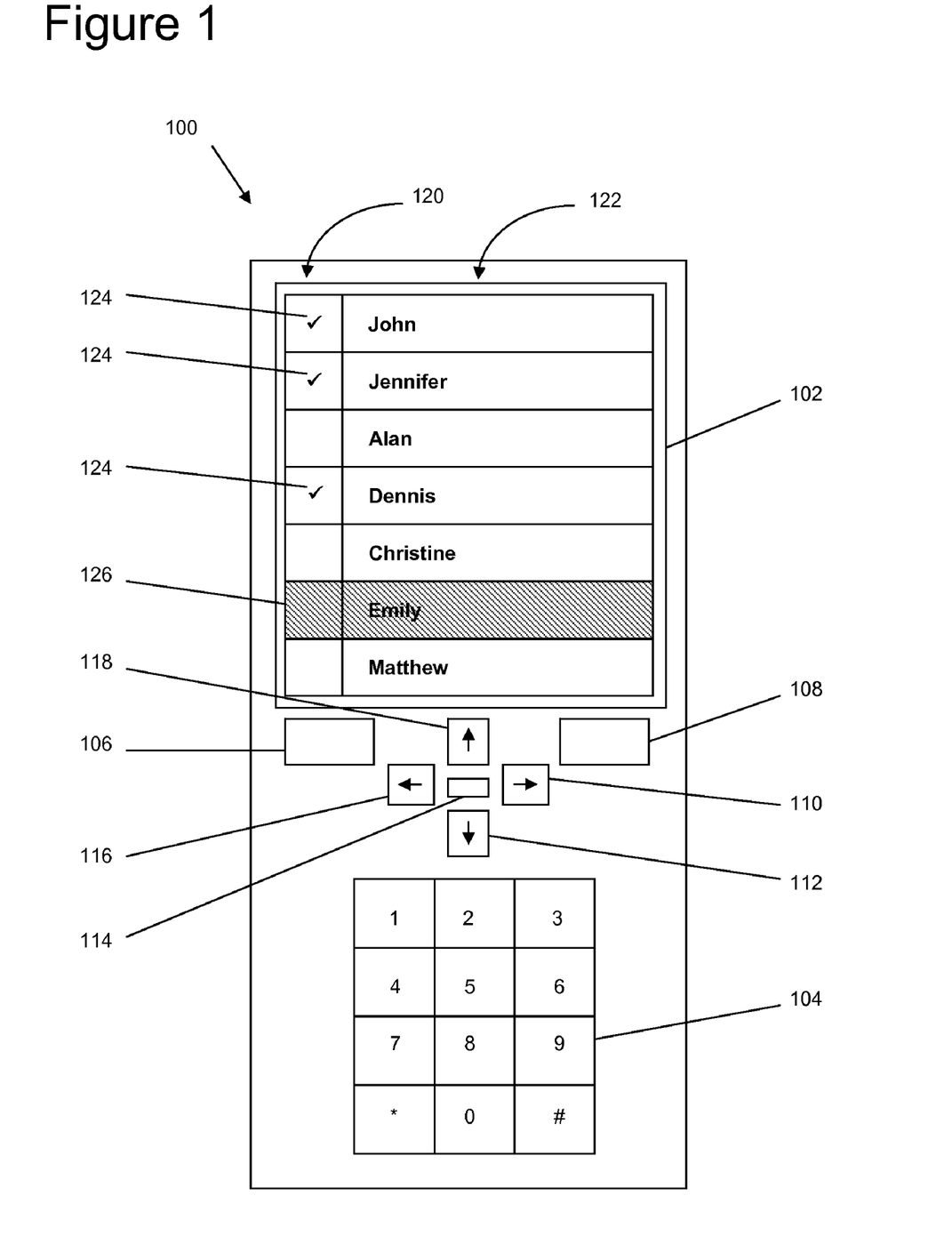

FIG. 1 illustrates a prior art mobile telephone 100. The mobile telephone 100 comprises a screen 102, a numeric keypad 104, directional cursor buttons 110, 112, 116, 118, a center (select) button 114, a "communicate" button 106 and a cancel button 108.

The screen 102 of mobile telephone 100 illustrated in FIG. 1 is displaying a graphical user interface (GUI) comprising a list of seven contacts 122 with which a user of the mobile telephone can set up a PTT call. Associated with each contact 122 is a check box 120. The contacts 122 are shown on the screen 102 in response to a user opening a PTT application program on the mobile telephone 100.

The user of the mobile telephone 100 can use the up and down cursor buttons 112, 118 to move a highlighted box 126 up and down through the list of contacts 122. The user can then select those contacts with which they desire to set up a PTT call by pressing the center button 114 when a desired user is highlighted. In this example the user has previously selected John, Jennifer and Dennis, as indicated by the check marks in the check box column 120. The highlighted box 126 is currently positioned over Emily. If the user were to press the "communicate" button 106 at this time, a PTT call would be initiated with John, Jennifer and Dennis.

If the user wishes to also include Emily in the PTT call, they must press the center button 114 while Emily is highlighted such that a check mark appears in the corresponding check box 120, before pressing the "communicate" button 106 to set up the call.

If the user wishes to remove a check mark 124 from a check box 120 they can press the center button 114 when the highlighted box 126 is located over the desired check box 120 and contact 122. Pressing the center button 114 toggles the status of the contact 122 between being selected as identified by a check mark 124 in check box 120, and being unselected as identified by the check box 120 being empty.

It is known for users to inadvertently omit a contact that is highlighted when they press the "communicate" button 106, as they have not selected that contact by pressing the center button 114 before pressing the "communicate" button. The fact that a contact can be highlighted and not selected can be perceived as ambiguous and confusing to a user.

Figure 2A:
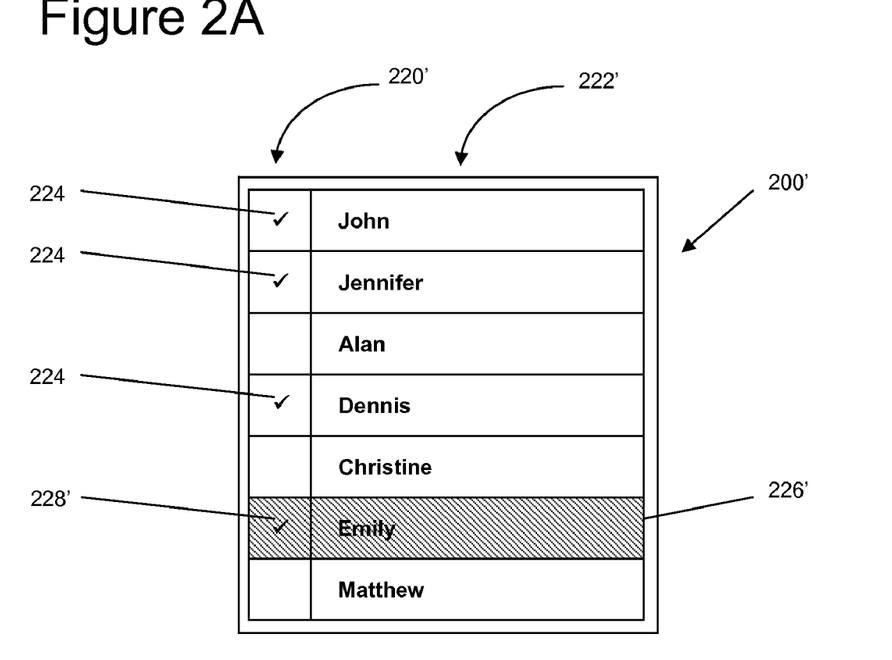
FIGS. 2A and 2B illustrate an embodiment of a GUI.

FIG. 2A illustrates an embodiment of a GUI 200' that can be displayed on a screen 102 of a mobile telephone 100 such as that illustrated in FIG. 1. In this embodiment, the same seven contacts 222' shown in FIG. 1 are illustrated, and the same three contacts (John, Jennifer, Dennis) have been selected by a user using the center button 114 to place a check mark 224 in the associated check boxes 220'. In addition, the highlighted box 226' is currently positioned over Emily.

In contrast to the GUI illustrated in FIG. 1, a check mark 228' is automatically placed in the check box 220' associated with the contact identified by the highlighted box 226'. In this embodiment, the check mark 228' may be known as a "floating check mark" as it "floats" with the highlighted box 226'. The floating check mark is not permanently associated with a contact 222' unless a user provides an input to that effect, such as the user pressing the center button 114 while the contact 222' is highlighted. The floating check mark 228' may be displayed differently to the other semi-permanent check marks 224, for example it may be a different color or it may be ghosted. A check mark 224 may be considered as semi-permanent if a user has provided a positive input that the contact is required, and the check mark 224 remains associated with the contact when the contact is no longer highlighted.

Figure 2B:
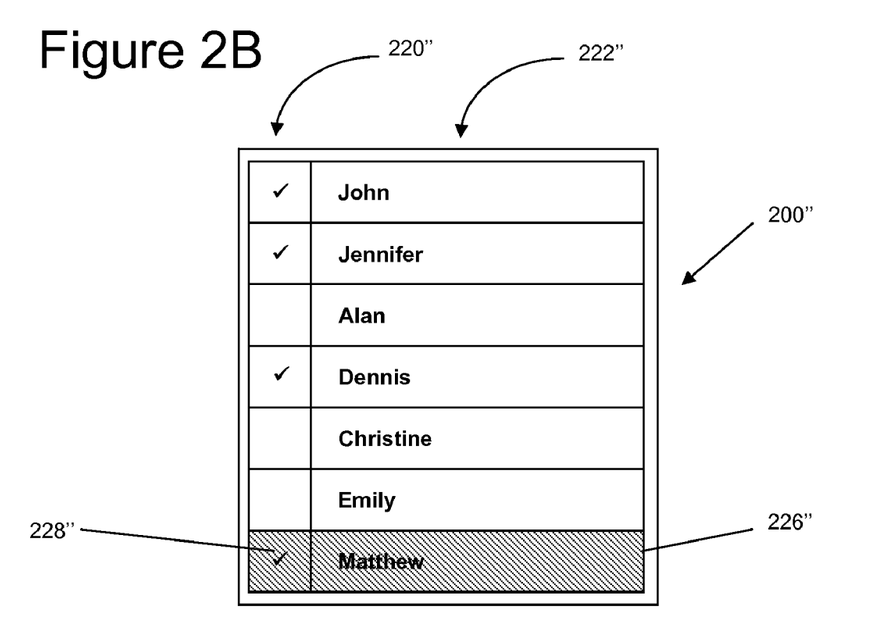

If the user were to press the "communicate" button 106 while the screen displayed on GUI 200' was being displayed, a PTT call would be set up with John, Jennifer, Dennis and Emily. Alternatively, if the user were to press the down cursor button 112 while the screen displayed the GUI 200' illustrated in FIG. 2A (that is, without pressing the center button 114 while Emily is highlighted), the GUI would change to that shown in FIG. 2B. The GUI 200" illustrated in FIG. 2B shows that the highlighted box 226" has moved from Emily to Matthew and that the floating check mark 228" has also moved from the check box associated with Emily to the check box associated with Matthew. If the user were to press the "communicate" button 106 while the screen is displaying the GUI

200'' illustrated in FIG. 2B, a PTT call would be set up with John, Jennifer, Dennis and Matthew.

In other embodiments, the "communicate" button may be considered as an "action" or "operation" button that performs a pre-defined operation on the selected contacts, such as adding the contacts to a group, deleting the contacts from a group or deleting the contacts altogether. The pre-defined operation may be any operation that is available in a PTT environment, or any other environment that is being used.

If at any time, the user wishes to convert a floating check mark 228 into a permanent check mark 224, they can press the center button 114 to select that contact 222. Alternatively, if a user wishes to remove the floating check mark 228 associated with the highlighted contact, they can press the center button 114 a first time to select, and a second time to subsequently deselect, that contact 222. This will cause the highlighted contact to be deselected such that pressing the "communicate" button will set up a PTT call with only those users who have been positively selected. As with the mobile phone illustrated in FIG. 1, pressing the center button 114 toggles the status of a highlighted contact.

Advantages associated with embodiments described herein can include reducing the number of keystrokes required for a user to select one or more contacts from a list before initiating a function associated with those contacts, and removing any ambiguity as to which contacts are currently selected for a subsequent operation such as a PTT call.

One or more embodiments disclosed herein can disambiguate highlighting for a local operation (such as selection) from inclusion in a global operation (such as setting up a PTT call with those contacts that have a check mark shown in a check box associated with the contact). This can be achieved by ensuring that a selection made in the local plane is also meaningful in the global plane. A selection can be made in multiple planes, for example, highlighting an item (local domain) can also provide an unambiguous indication in the global domain by associating a floating check with the highlighted item.

Setting up the PTT call with John, Jennifer, Dennis and Emily using the embodiment of FIG. 2A requires nine keystrokes, assuming the GUI initially shows John as highlighted. The nine keystrokes are:

1—center button 114 to select John;
2—down cursor button 112;
3—center button 114 to select Jennifer;
4—down cursor button 112;
5—down cursor button 112;
6—center button 114 to select Dennis;
7—down cursor button 112;
8—down cursor button 112 to highlight Emily; and
9—communicate button 106 to set up the call.

By way of comparison, setting up the same PTT call using the mobile telephone of FIG. 1 requires ten keystrokes. An additional press of the center button 114 is required after keystroke number 8 above to select Emily before the communicate button 106 is pressed.

It will be appreciated that in other embodiments, the list of items need not necessarily be a list of contacts on a mobile telephone. Any items that can be selected for a subsequent function/operation can be used with one or more of the embodiments described herein, for example selecting items to purchase from an online shop, selecting computer files to attach to an email, and selecting image files to be printed. Furthermore, any means of selecting the items, for example the cursor buttons illustrated in FIG. 1, a joystick, a scroll wheel, a touch sensitive screen, or any combination thereof can also be used with embodiments described herein. In addition, it will be appreciated that the features of the embodiments described herein are not limited to mobile telephones, and can equally be employed in any other data processing apparatus. The data processing apparatus may be a computing device, such as a personal computer (PC), a laptop, or a personal digital assistant (PDA) or any form of communications device.

In some embodiments, the contents of the list may be dynamic and may change over time. For example, the list of available contacts for setting up a PTT call may change as contacts change their presence/status as they become online and offline.

Figure 3:
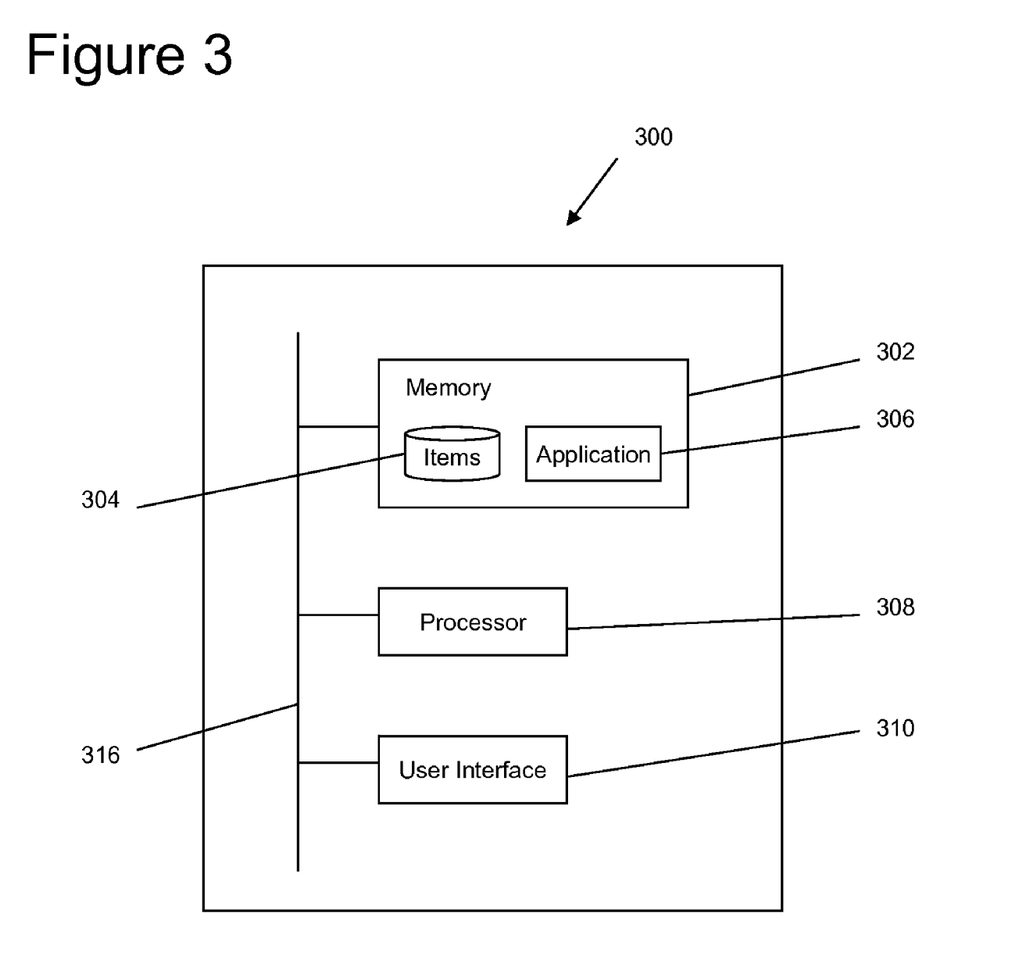
FIG. 3 illustrates an embodiment of a data processing apparatus.

FIG. 3 shows schematically a data processing apparatus 300 such as the mobile telephone 100 illustrated in FIG. 1. The data processing apparatus 300 comprises memory 302, a processor 308, and a user interface 310, all of which are connected to a data bus 316.

Stored in memory 302 is a list of items 304 such as a list of contacts as described in relation to FIGS. 1 and 2, and a floating check mark application program 306. The floating check mark application program 306 can be run by processor 308 and is configured to operate in the same way as described in FIG. 2.

The user interface 310 is configured to generate signals that will cause the list of items 304, or a subset of the list of items 304, to be displayed to a user of the data processing apparatus 300. The user interface 310 is also configured to receive signals representative of a user's selection of one or more of the items 340 and a user's selection of an option to initiate a subsequent operation.

In some embodiments the data processing apparatus 300 may also comprise a communications interface for sending data from, and/or receiving data at, the data processing apparatus 300. In some embodiments a communications interface is not essential as all processing may be performed locally at the data processing apparatus 300. The data processing apparatus 300 may also have a PTT application (not shown) stored in memory 302 that can use the items/contacts selected from the list of items 304 by the floating check mark application program 306.

Embodiments described herein can improve the usability of the data processing apparatus, and can provide a more efficient way of navigating and selecting items from a list/menu. The keystrokes required to select one or more items from the list may be reduced compared with prior art systems, as the final item that is to be used for the subsequent operation can be selected as a default when that item is highlighted. That is, the final item can be selected without the requirement for the user to press a key to indicate that the item is to be used for the subsequent operation.

Figure 4:
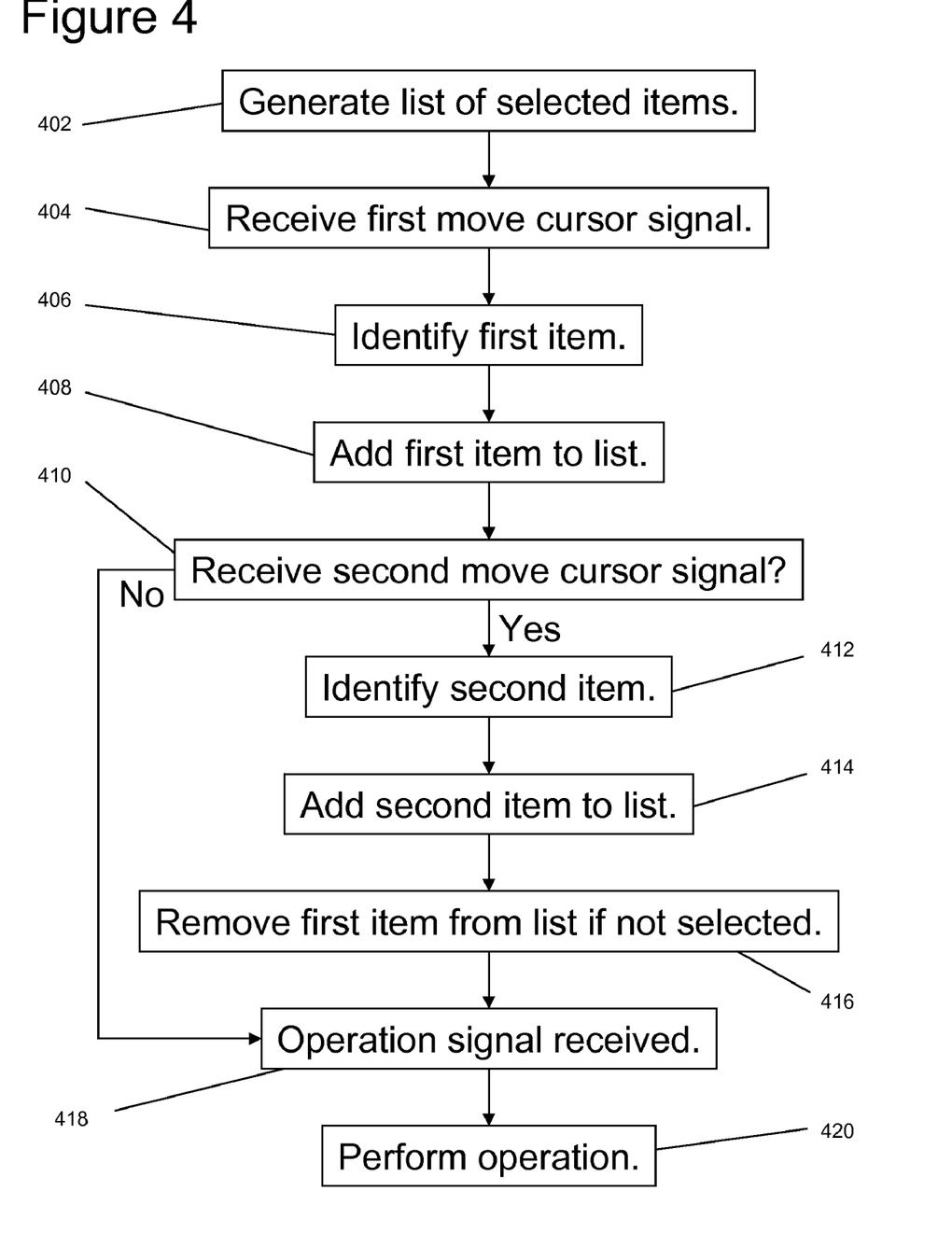
FIG. 4 shows schematically a process flow control diagram for an embodiment as described.

FIG. 4 is a process control flow diagram for an embodiment of a data processing apparatus. Referring first to step 402, a list of at least one selected items is generated. The list of selected items may be generated by a user scrolling through displayed items and manually adding one or more of the displayed items to the list, or by a user selecting a predefined group of items from memory.

At step 404, a first "move cursor signal" received in response to a user input, for example by the user scrolling through the displayed items as described above. Responsive to the receipt of the first move cursor signal, a first item is identified at step 406 and added to the list of selected items at step 408. The first item is an item that is associated with the location of the cursor as represented by the first move cursor signal. For example, a move cursor signal may represent an item, or items, that have been highlighted by the user.

If a second move cursor signal is received at step 410, a second item is identified at step 412 and added to the list of selected items at step 414. The second item is an item associated with the new location of the cursor as represented by the second move cursor signal. Also, the first item is removed from the list of selected items at step 416, and this may comprise determining if the first item has not been positively selected by the user. The second item can replace the first item in the list of selected items if it is not selected by a user. The first and second items may be considered as automatically being provisionally selected when they are identified in response to receipt of a move cursor signal.

An operation signal is received at step 418 and the operation is performed at step 420. The operation signal may be received after the processing performed responsive to receipt of the first move cursor signal (after step 408) or the second move cursor signal (after step 416).

In other embodiments, any number of move cursor signals may be received before an operation signal is received at step 418. Steps 410 to 416 may be repeated for a third, fourth and any subsequent move cursor signals. In addition any number of selection and/or deselection signals may be received before an operation signal is received at step 418 as described in more detail in relation to FIG. 5.

Figure 5:
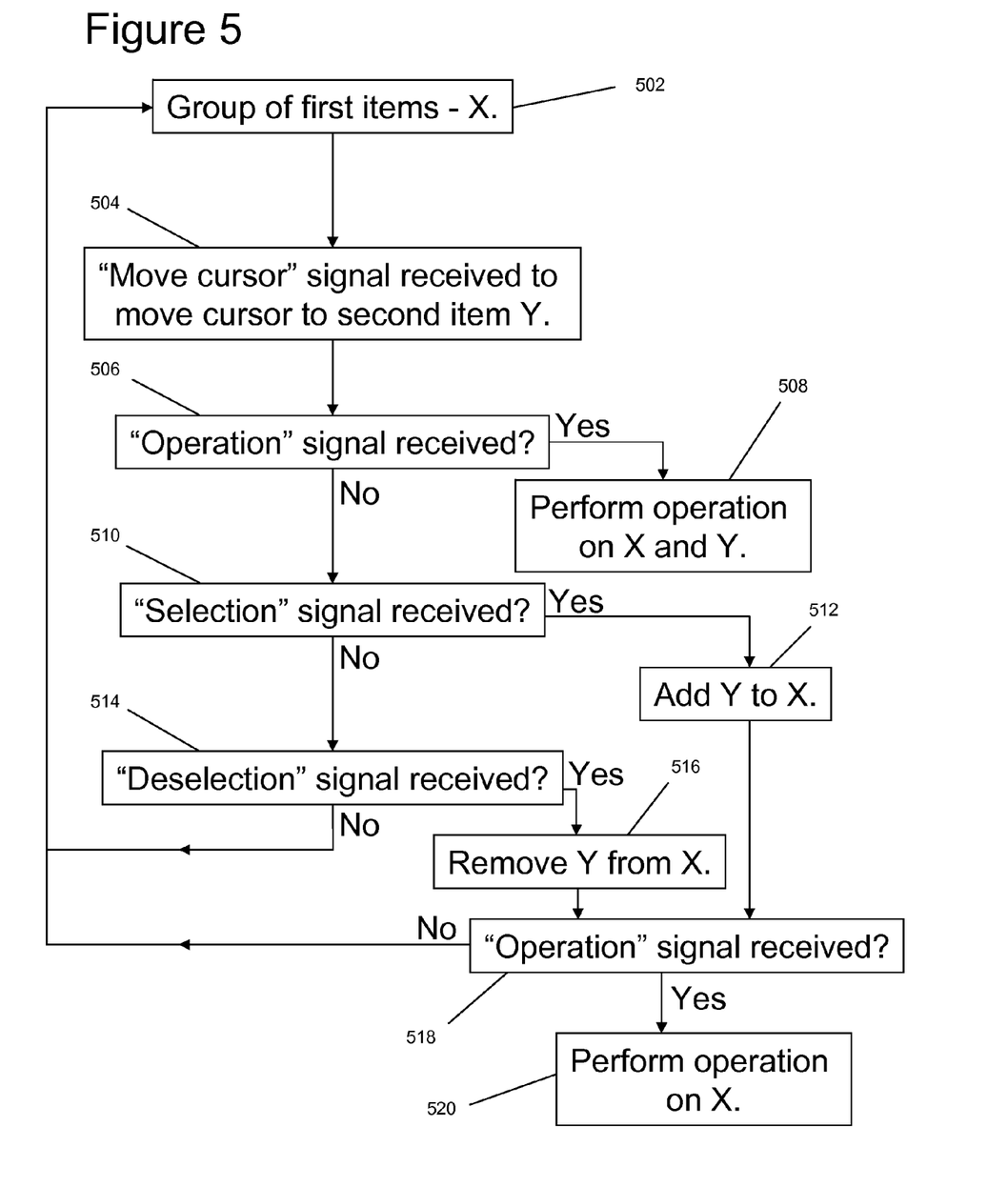
FIG. 5 shows schematically a process flow control diagram for an embodiment as described.

FIG. 5 is a process flow control diagram for an embodiment of a data processing apparatus. At step 502 there is a group of selected items labeled "X". The group X may initially comprise no items, or may have already been populated by one or more items, such as by a user selecting items from a list that are to be added to group X.

At step 504, responsive to user input, a cursor is moved to an item labeled "Y" in a list of items and a move cursor signal is received. Moving the cursor to item Y, causes that item to be highlighted on a display of the data processing apparatus. Item Y may, or may not, already be present in group X.

At step 506 the process flow determines whether or not an "operation signal" has been received. The operation signal is indicative of a user's input to request that an operation is performed on one or more of the items. For example, the operation signal may be generated when a user presses a "communicate" button to set up a PTT call with one or more contacts/items.

If the user decides to initiate the operation before providing an input to select or deselect item Y then the operation is performed at step 508 on all of the items in group X as well as the highlighted item: item Y. If the user does not initiate an operation at step 506, the process flow moves on to determine if they have provided an input indicative of selecting or deselecting an item or they have moved the cursor to highlight a different item.

If the process flow determines at step 506 that an operation signal has not been received, the process flow moves on to step 510 to determine whether or not a "selection signal" has been received indicative of a user's input to select the item Y. If a selection signal has been received, the process flow moves on to step 512 where item Y is added to group X. The process flow then moves on to step 518 to check if an operation signal has been received, and if it has been received the operation is performed on group X at step 520. If an operation signal has not been received at step 518, the process flow returns to step 502.

If a selection signal has not been received at step 510, the process flow moves on to step 514 to determine if a "deselection signal" has been received. If a deselection signal has been received at step 514, then item Y is removed from the group X at step 516 (if item Y is not part of group X then no action is performed at step 516), and the process flow moves on to step 518 to determine whether or not an operation signal has been received. If an operation signal has been received, then the operation is performed on group X, and if not the process flow returns to step 502. If it is determined that a deselection signal has not been received at step 514, the process flow returns to step 502. It will be appreciated that the items on which the operation is performed depends upon whether or not an item that is highlighted has been selected or deselected by a user. If the user has not selected or deselected a highlighted item when an operation is initiated (an operation signal is received), the operation is also performed on that highlighted item.

One or more embodiments described herein may provide a reduction in the number of keystrokes required for a user to select one or more items of data from a list before initiating an operation associated with those data items, and/or may reduce ambiguity as to which data items are selected for a subsequent operation. This may be achieved by associating a "floating check mark" with a data item when it is highlighted such that a user can unambiguously and easily determine whether or not that data item is currently selected for the subsequent operation.

Highlighting for a local operation (such as moving a cursor over data items for adding data items to a list of selected items) may be disambiguated from the selection of data items for a global operation (the subsequent operation on the data items that have been added to list of selected data items).

Insofar as embodiments described herein are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

It will be appreciated that any of the application programs, or any other logical module, may be made up of more than one functional unit that may be distributed across more than one server/computer. The one or more server computers may or may not be in the same physical location.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for data processing system and process that include configuration, identification and determination through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of operating a data processing apparatus to perform an operation on a plurality of items of data, the apparatus having a memory storing data identifying said plurality of items of data, the method comprising:
    generating a list of selected items of data identifying at least one item of data in response to a first selection signal, wherein a selection signal includes pressing a selection button and releasing the selection button;
    performing a selection operation to add at least one further item of data to said list of selected items of data by:
    responsive to a first move cursor signal, identifying a first item of data of said plurality of items of data stored in said memory, and provisionally adding said first identified item of data to said list of selected items of data if said item is not already on said list; and
    responsive to a consecutive move cursor signal:
    removing said first identified item of data from said list of selected items of data if said consecutive move cursor signal was received prior to a further selection signal, said further selection signal indicating that said first identified item is to stay on said list of selected items;
    identifying a second item of data of said plurality of items of data stored in said memory, and provisionally adding said second identified item of data to said list of selected items of data if said second item is not already on said list; and
    performing an operation on the items identified by said list of selected items of data in response to receipt of an operation signal.

2. The method of claim 1, wherein said data identifying said plurality of items comprises contacts in an address book.

3. The method of claim 2, wherein performing the operation comprises setting up a communications operation with the contacts identified by said list of selected items of data.

4. The method of claim 3, wherein the communications operation is a push-to-talk call.

5. The method of claim 2, wherein performing the operation comprises performing a push-to-talk operation on the contacts identified by said list of selected items of data.

6. The method of claim 1, wherein identifying the first or second item comprises displaying and highlighting the respective first or second item on a user interface of the data processing apparatus.

7. The method of claim 1, wherein identifying the first or second item comprises displaying a check mark in association with the respective first or second item on a user interface of the data processing apparatus.

8. A data processing apparatus configured to perform an operation on a plurality of items of data, comprising:
    a memory configured to store data identifying said plurality of items of data; and a processor configured to:
    generate a list of selected items of data identifying at least one item of data in response to a first selection signal, wherein a selection signal includes pressing a selection button and releasing the selection button;
    perform a selection operation to add at least one further item of data to said list of selected items of data by:
    responsive to a first move cursor signal, identifying a first item of data of said plurality of items of data stored in said memory, and provisionally adding said first identified item of data to said list of selected items of data if said item is not already on said list;
    responsive to a consecutive move cursor signal:
    identifying a second item of data of said plurality of items of data stored in said memory, removing said first identified item of data from said list of selected items of data if said consecutive move cursor signal was received prior to a further selection signal, said further selection signal indicating that said first identified item is to stay on said list of selected items;
    provisionally adding said second identified item of data to said list of selected items of data if said second item is not already on said list; and
    performing an operation on the items identified by said list of selected items of data in response to receipt of an operation signal.

9. The data processing apparatus of claim 8, wherein said data identifying said plurality of items of data are contacts in an address book.

10. The data processing apparatus of claim 9, wherein the processor is configured to set up a communications operation with the contacts identified by said list of selected items of data.

11. The data processing apparatus of claim 10, wherein the communications operation is a push-to-talk call.

12. The data processing apparatus of claim 9, wherein the processor is configured to perform a PTT operation on the contacts identified by said list of selected items of data.

13. The data processing apparatus of claim 8 comprising a user interface, wherein identifying the first or second item comprises displaying and highlighting the respective first or second item on the user interface.

14. The data processing apparatus of claim 8 comprising a user interface, wherein identifying the first or second item comprises displaying a check mark in association with the respective first or second item on a user interface of the data processing apparatus.

15. The data processing apparatus of claim 8, wherein the data processing apparatus comprises one of a mobile computing device, a mobile telephone, a personal digital assistant, a personal computer and a laptop.

16. A computer readable storage medium configured to store instructions thereon, the instructions when executed by a processor cause the processor to:
generate a list of selected items of data identifying at least one item of data in response to a first selection signal, wherein a selection signal includes pressing a selection button and releasing the selection button;
perform a selection operation to add at least one further item of data to said list of selected items of data through further instructions that cause the processor to:
responsive to receipt of a first move cursor signal, identify a first item of data of said plurality of items of data stored in said memory, and provisionally add said first identified item of data to said list of selected items of data if said item is not already on said list;
responsive to a receipt of a consecutive move cursor signal:
identify a second item of data of said plurality of items of data stored in said memory, and remove said first identified item of data from said list of selected items of data if said consecutive move cursor signal was received prior to a further selection signal, said further selection signal indicating that said first identified item is to stay on said list of selected items;
provisionally add said second identified item of data to said list of selected items of data if said second item is not already on said list; and
perform an operation on the items identified by said list of selected items of data in response to receipt of an operation signal.

17. The computer readable storage medium of clam 16, wherein said data identifying said plurality of items comprises contacts in an address book.

18. The computer readable storage medium of claim 17, wherein instructions that cause the processor to perform the operation comprises instructions that cause the processor to set up a communications operation with the contacts identified by said list of selected items of data.

19. The computer readable storage medium of claim 18, wherein communications operation is a push-to-talk call.

20. The computer readable storage medium of claim 17, wherein the instructions that cause the processor to perform the operation comprises instructions that cause the processor to perform a push-to-talk operation on the contacts identified by said list of selected items of data.

21. The computer readable storage medium of claim 16, wherein the instructions that cause the processor to identify the first or second item comprises instructions that cause the processor to display and highlight the respective first or second item on a user interface of the data processing apparatus.

* * * * *

UNITED STATES PATENT AND TRADEMARK OFFICE
CERTIFICATE OF CORRECTION

PATENT NO. : 8,365,097 B2
APPLICATION NO. : 11/937157
DATED : January 29, 2013
INVENTOR(S) : Ivo Ruben Willem Jager et al.

It is certified that error appears in the above-identified patent and that said Letters Patent is hereby corrected as shown below:

In the Claims:

In column 12, line 17, in Claim 17, delete "clam" and insert -- claim --, therefor.

Signed and Sealed this
Seventh Day of May, 2013

Teresa Stanek Rea
*Acting Director of the United States Patent and Trademark Office*